US008505096B2

(12) United States Patent
Griffin et al.

(10) Patent No.: US 8,505,096 B2
(45) Date of Patent: Aug. 6, 2013

(54) METHODS OF, AND APPARATUS FOR, MONITORING TRAFFIC EMANATING FROM A SOURCE IN A NETWORK

(76) Inventors: Jonathan Griffin, Bristol (GB); Andrew Patrick Norman, Bristol (GB); Matthew Murray Williamson, Palo Alto, CA (US)

( * ) Notice: Subject to any disclaimer, the term of this patent is extended or adjusted under 35 U.S.C. 154(b) by 2709 days.

(21) Appl. No.: 11/192,469

(22) Filed: Jul. 29, 2005

(65) Prior Publication Data
US 2006/0023637 A1 Feb. 2, 2006

(30) Foreign Application Priority Data
Jul. 30, 2004 (GB) .................................. 0417139.3

(51) Int. Cl.
*H04L 29/06* (2006.01)

(52) U.S. Cl.
USPC ............................................. 726/23; 726/25

(58) Field of Classification Search
USPC .......................................... 726/22, 23, 24, 25
See application file for complete search history.

(56) References Cited

U.S. PATENT DOCUMENTS

| | | | | |
|---|---|---|---|---|
| 7,089,591 | B1 * | 8/2006 | Chi .................................. | 726/24 |
| 7,159,149 | B2 * | 1/2007 | Spiegel et al. .................. | 714/43 |
| 7,228,564 | B2 * | 6/2007 | Raikar et al. .................... | 726/23 |
| 7,254,133 | B2 * | 8/2007 | Govindarajan et al. ....... | 370/394 |
| 7,272,854 | B2 * | 9/2007 | Marceau et al. ................ | 726/22 |
| 7,373,665 | B2 | 5/2008 | Williamson et al. | |
| 7,436,770 | B2 * | 10/2008 | Sterne et al. ................... | 370/235 |
| 7,437,758 | B2 | 10/2008 | Williamson et al. | |
| 7,478,431 | B1 * | 1/2009 | Nachenberg ..................... | 726/24 |
| 2004/0083372 | A1 | 4/2004 | Williamson et al. | |
| 2004/0218615 | A1 | 11/2004 | Griffin et al. | |
| 2005/0010753 | A1 * | 1/2005 | Marceau et al. ............... | 713/153 |
| 2005/0021740 | A1 * | 1/2005 | Bar et al. ........................ | 709/224 |
| 2005/0039047 | A1 * | 2/2005 | Raikar et al. ................... | 713/201 |
| 2005/0257269 | A1 * | 11/2005 | Chari et al. ..................... | 726/25 |
| 2005/0265233 | A1 * | 12/2005 | Johnson et al. ................ | 370/229 |
| 2005/0289245 | A1 | 12/2005 | Griffin et al. | |
| 2006/0072451 | A1 * | 4/2006 | Ross .............................. | 370/229 |
| 2006/0250954 | A1 * | 11/2006 | Mulrane et al. ................ | 370/229 |
| 2006/0294590 | A1 * | 12/2006 | Enstone et al. ................. | 726/24 |
| 2007/0086334 | A1 * | 4/2007 | Wakumoto et al. ........... | 370/229 |
| 2007/0101429 | A1 * | 5/2007 | Wakumoto et al. ............ | 726/23 |
| 2008/0095065 | A1 * | 4/2008 | Albrecht ........................ | 370/252 |
| 2008/0205273 | A1 * | 8/2008 | Wackerly ....................... | 370/235 |
| 2009/0016221 | A1 * | 1/2009 | Wakumoto .................... | 370/233 |
| 2009/0031423 | A1 * | 1/2009 | Liu et al. ........................ | 726/24 |

OTHER PUBLICATIONS

Sanjay Goel, Stephen F. Bush, Kolmogorov Complexity Estimates for Detection of Viruses in Biologically Inspired Security Systems: A Comparison With Traditional Approaches, Nov.-Dec. 2003, Complexity Journal.*

(Continued)

*Primary Examiner* — David Garcia Cervetti

(57) ABSTRACT

One embodiment of an apparatus for monitoring from a first location in a computer network traffic emanating from a source at a second location in the network, the apparatus comprising means at the first location for detecting traffic emanating from the source and means for monitoring the number, per unit time, of distinct destinations of the traffic that lie outside a first set specifying familiar destinations of the traffic. This monitoring process can trigger various responses such as the isolation of the source from the network. Other systems and methods are also provided.

39 Claims, 9 Drawing Sheets

(56) References Cited

OTHER PUBLICATIONS

Jamie Twycross, Matthew M. Williamson, Implementing and testing a virus throttle, May 2003, HP Labs.*

Sidiroglou, S.; Keromytis, A.D., "Countering network worms through automatic patch generation," Security & Privacy, IEEE, vol. 3, No. 6, pp. 41-49, Nov.-Dec. 2005.*

Mian Zhou and Sheau-Dong Lang, Mining Frequency Content of Network Traffic for Intrusion Detection, Proceedings of the IASTED International Conference on Communication, Network, and Information Security (CNIS 2003). Dec. 2003.*

Williamson, M.M., "Throttling viruses: restricting propagation to defeat malicious mobile code," Computer Security Applications Conference, 2002. Proceedings. 18th Annual, vol., No., pp. 61-68, 2002.*

Michelle Delio, "Virus Throttle a Hopeful Defense", http://www.wired.com/printtechbiz/it/news/2002/12/56753, retrieved from the internet on Apr. 27, 2009.

Matthew M. Williamson, "Design, Implementation and Test of an Email Virus Throttle", Jun. 30, 2003, Copyright Hewlett-Packard Company 2003.

Jamie Twycross and Matthew M. Williamson, "Implementing and Testing a Virus Throttle", May 21, 2003, Proceedings 12th USENIX Security Symposium, Aug. 4-8, 2003, Washington, DC, USA, Copyright Hewlett-Packard Company 2003.

Matthew M. Williamson, "Throttling Viruses: Restricting Propagation to Defeat Malicious Mobile Code", 18th Annual Computer Security Applications Conference, Dec. 9-13, 2002, http://www.acsac.org/2002/abstracts97.html, retrieved from the internet on Apr. 22, 2009.

Matthew M. Williamson, Alan Parry, and Andrew Byde, "Virus Throttling for Instant Messaging", May 5, 2004, Virus Bulletin Conference, Sep. 2004, Chicago, IL, USA, Copyright Hewlett-Packard Company 2004.

* cited by examiner

METHODS OF, AND APPARATUS FOR, MONITORING TRAFFIC EMANATING FROM A SOURCE IN A NETWORK

CLAIM TO PRIORITY

This application claims priority to copending United Kingdom utility application entitled, "METHODS OF, AND APPARATUS FOR, MONITORING TRAFFIC EMANATING FROM A SOURCE IN A NETWORK," having serial no. GB 0417139.3, filed Jul. 30, 2004, which is entirely incorporated herein by reference.

BACKGROUND

It is common practice to interconnect computers to form networks; the benefits offered by this approach are widely understood. In addition to computers, a network will typically contain ancillary devices, such as printers and traffic routers, which also have some data processing ability. It is often useful to refer to such devices and computers collectively as data processing machines. In this document, such entities will be referred to simply as "machines."

FIG. 1 shows an IP (internet protocol) network, which is a common type of computing network. In an IP network, machines are assigned IP addresses. An IP address is a 32 bit binary number and is usually rendered in decimal form by treating the 32 bit address as four concatenated 8 bit words and converting each 8 bit word into a decimal number in the range 0 to 255, thus producing a sequence of four decimal numbers. An example of an IP address in decimal form is 17.154.11.117.

In an IP network, traffic can be sent to a particular machine by directing the traffic to the IP address of the machine concerned. However, a machine participating in an IP network may be required to handle network traffic relating to several different tasks at the same time. To cater for situations such as this, it is usual for a machine to differentiate between traffic for different tasks by allocating "port numbers" to the tasks. Thus, rather than describe traffic as passing from one machine to another, it is more usual to refer to traffic passing from a specific port on one machine to a particular port on another machine.

Certain port numbers are reserved for certain purposes. For example, port numbers 21, 25, 53 and 80 are reserved port numbers. Port number 80 is reserved for web access. If a machine hosts a web server application, then that application will monitor port 80 for requests from the network for web content. Port 21 is used in a similar manner for file-serving. If a machine hosts a file server application, then that application will monitor port 21 of the host machine for (FTP) file transfer protocol requests. Ports 25 and 53 are used in a similar manner for SMTP (i.e., e-mail) and DNS (domain name service) traffic. A DNS application is responsible for resolving a tendered, human-readable, Internet address (e.g. www.hp.com) into an IP address (or vice versa) or for referring the conversion request elsewhere for completion.

Traffic travels in and out of the network 10 through a router 12. Within the network 10, the machines are arranged in subnets. Two subnets 14 and 16 are shown in FIG. 1. Subnet 14 has a router 18 and subnet 16 has a router 20. Traffic enters and leaves subnet 14 through router 18 and, likewise, traffic enters and leaves subnet 16 through router 20. The network 10 also includes a switch 22, to which the three routers 12, 18, and 20 are connected. The switch 22 allows network traffic to pass between the three routers. For example, traffic emanating from subnet 14 and destined for subnet 16 passes out of subnet 14 through router 18 and then through switch 22 to router 20 and then into subnet 16. It will be appreciated that, in practice, a subnet may include several routers for allowing traffic to pass across the boundary of the subnet. Similarly, a network is, in practice, likely to contain more than one switch in order to provide a desired pattern of connections for allowing traffic to pass between the subnets and the network boundary.

FIG. 2 shows an example of a subnet. The subnet 23 contains a router 24, which provides a means for traffic to enter and leave the subnet. The router 24 is connected to a switch 26, and the switch is connected to four other machines 28, 30, 32, and 34. The four machines 28, 30, 32, and 34 can communicate with one another by sending traffic through the switch 26. Also, the four machines 28, 30, 32 and 34 can access the router 24 through the switch 26 for the purposes of sending traffic to, and receiving traffic from, the wider network outside the subnet.

It is normal practice for machines in a subnet of an IP network to be assigned IP addresses which, in binary form, begin with a common sequence of bits followed by a unique (within the subnet, at least) sequence of bits. The common portion of the IP addresses within a subnet is known as the subnet address. For example, if one assumes that the IP address of 17.154.11.117 belongs to a machine in a subnet of 256 members whose IP addresses range from 17.154.11.0 to 17.154.11.255, then the address of the subnet is 17.154.11.

Traffic within an IP network can be characterized as conforming to a connection-based or connectionless protocol. Both types of traffic can be flowing at the same time. In a connection-based protocol, such as HTTP (hypertext transfer protocol), two intercommunicating machines will establish a logical connection with one another before transmitting data between themselves, the logical connection providing, amongst other things, a mechanism for checking the safe receipt of data that is to be transmitted. A connection is normally established by one machine sending another a packet containing a connection request. In a connectionless protocol, by contrast, there is no coordination between machines prior to sending data between them. RTSP (real time streaming protocol) is an example of a connectionless protocol.

Associating machines to form a network has certain drawbacks. For example, it may become difficult to control the behavior of a machine in a network, since the machine will, in all probability, be influenced in its behavior by its interactions with other machines in the network. Insofar as certain behaviors may be undesirable to an operator of a machine, certain communications between networked machines are also undesirable. For example, a virus can be regarded as a communication that is sent to a machine to cause a change in the behavior of the machine. The types of behavioral change that are considered undesirable often involve the weakening of the security of a machine, the removal of information from a machine, or the transmission of information away from a machine.

A virus usually propagates by causing a machine to communicate the virus to one or more other machines. Schemes exist for impeding this propagation. For example, it is possible to use firewalls and other related network access technologies to control the traffic that enters or leaves a network. For example, in the network 10 of FIG. 1, a firewall could be installed in the router 12. In general terms, a firewall examines traffic attempting to cross a network boundary, classifies this traffic as either permissible or impermissible and allows only permissible traffic to cross the network boundary 11. The criteria used by a firewall to assess this permissibility are normally determined by a human administrator. In practice, a firewall or other network access control technology will not succeed in blocking all of the traffic that such an administrator would wish to block. For example, an administrator may fail to identify a certain type of undesirable traffic to a firewall, perhaps because he is unaware of that type or he is unable to categorize that type to the firewall. This problem is often exacerbated in practice, since networks tend to have more than just a single access point at which traffic can cross the network boundary.

A genre of mechanisms called throttles can complement firewalls and similar schemes in the control of virus action. A throttle is a mechanism, usually implemented in software, that controls the communications sent out from a machine. In the present document, a machine that is under the control of a throttle will be referred to as a throttled machine and a machine that is not under the control of a throttle will be called an unthrottled machine. In general terms, a throttle monitors the traffic that a machine is attempting to send out and governs the rate at which the machine may send traffic to other machines that are not familiar contacts of the machine. Typically, a throttle will allow a machine to send traffic freely to up to a maximum number F of destinations that are regarded as familiar to the machine and to send traffic to other destinations at up to a maximum rate of R distinct destinations per unit time. By using a throttle, the speed of propagation of a virus can be reduced considerably.

The failure of a throttle, due to, for example, deactivation or circumvention by a user or a virus, is undesirable since, clearly, a virus, if present, will be able to spread more freely. From a network management perspective, throttle failure is particularly undesirable given that some viruses, such as Nimda, are optimized for determining the addresses that might correspond to machines that neighbor an infected machine inside a network.

SUMMARY

According to one aspect, the present disclosure provides an apparatus for monitoring from a first location in a computer network traffic emanating from a source at a second location in the network, one embodiment of the apparatus comprising means at the first location for detecting traffic emanating from the source and means for monitoring the number, per unit time, of distinct destinations of the traffic that lie outside a first set specifying familiar destinations of the traffic.

The present disclosure also relates to a method of monitoring from a first location in a computer network traffic emanating from a source at a second location in the network, one embodiment of the method comprising a step of detecting at the first location traffic emanating from the source and a step of monitoring the number, per unit time, of distinct destinations of the traffic that lie outside a first set specifying familiar destinations of the traffic.

Thus, embodiments of the present disclosure provide a way of monitoring the behavior of a source of network traffic in terms of a characteristic of traffic emanating from the source and facilitates the detection of throttle failure.

The monitoring of the number, per unit time, of destinations of the traffic lying outside the first set may be achieved with or without knowledge of the membership of the first set.

If, for example, it is intended that traffic emanating from the source be limited such that, per unit time, the source is not to send traffic to more than the membership of the first set plus a predetermined number of other destinations, then assessment of the actual number, per unit time, of different destinations to which the source sends traffic against the number, per unit time, specified by the limitation allows deductions to be made about the number, per unit time, of destinations of the traffic lying outside the first set. In this scenario, no knowledge of the membership of the first set is required.

In other embodiments, the monitoring of the number, per unit time, of destinations of the traffic lying outside the first set may require knowledge of the membership of the first set. For example, it is possible to compare destinations of traffic emanating from the source directly with the first set is determine if they lie outside.

Embodiments of present disclosure may or may not require direct calculation of the number, per unit time, of destinations of the traffic lying outside the first set or the number of destinations outside the first set to which the source sends traffic in a given period of time. As an example of the indirect approach, some embodiments could be arranged to assess the number, per unit time, of destinations of the traffic lying outside the first set by assigning destinations of the traffic lying outside the first set into a second set, depleting the second set at a predetermined rate and examining the size of the second set, e.g. by comparing with a threshold.

A response may be initiated upon the monitored number, per unit time, of destinations of the traffic lying outside the first set satisfying a predetermined condition. The response may, for example, involve one or more of isolating the source from the network or imposing a throttle on the source.

HTTP and some other protocols require that traffic be conveyed between machines through a logical construct called a connection that is established on the basis of a connection request. In order to determine the destinations of traffic emanating from the source and complying with such a protocol, it may suffice to acquire the destinations specified in connection requests emanating from the source.

Embodiments of the present disclosure can also be implemented as a computer program, conveyed, potentially, by a suitable data carrier.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

By way of example only, certain embodiments of the present disclosure will now be described with reference to the accompanying drawings, in which.

DETAILED DESCRIPTION

Figure 1:
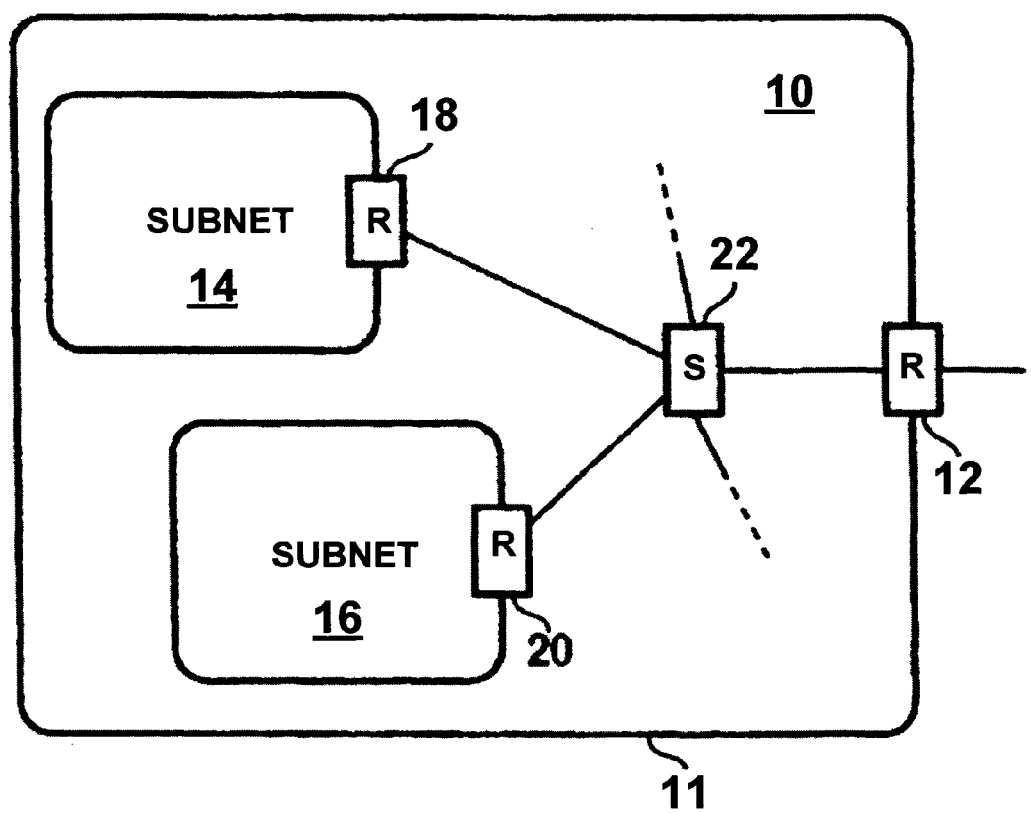
FIG. 1 is a block diagram of an IP network.
Figure 2:
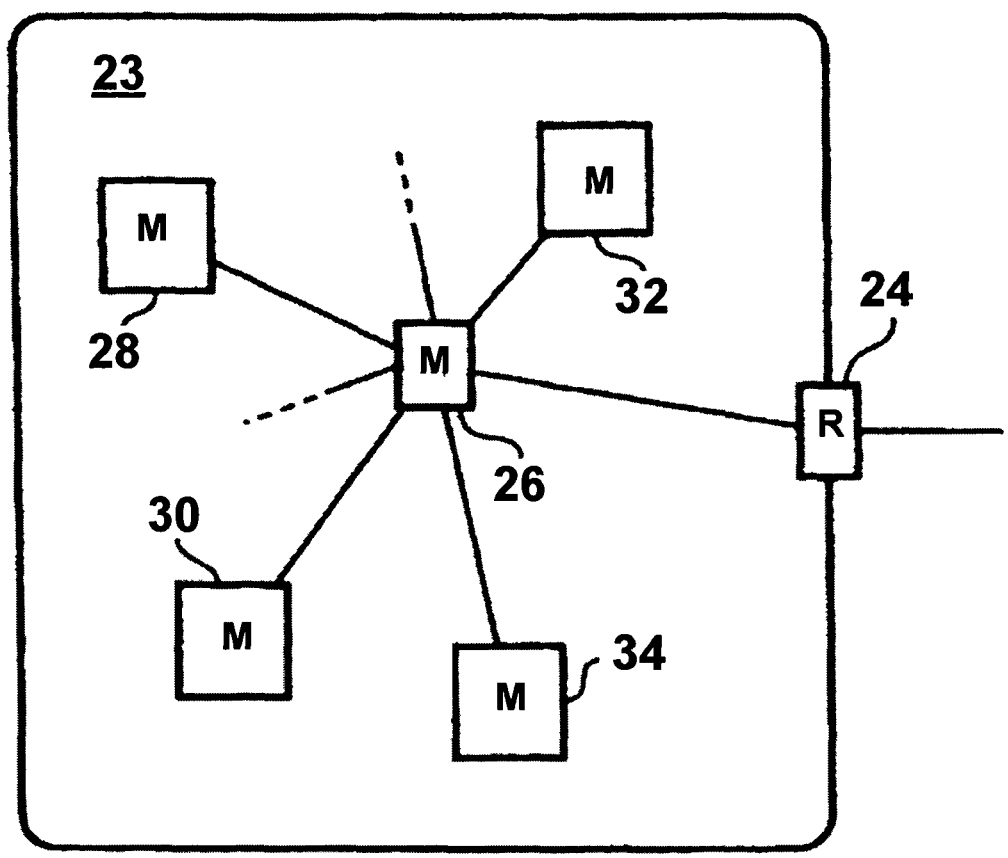
FIG. 2 is a block diagram of an embodiment of a subnet within the network of FIG. 1.
Figure 3:
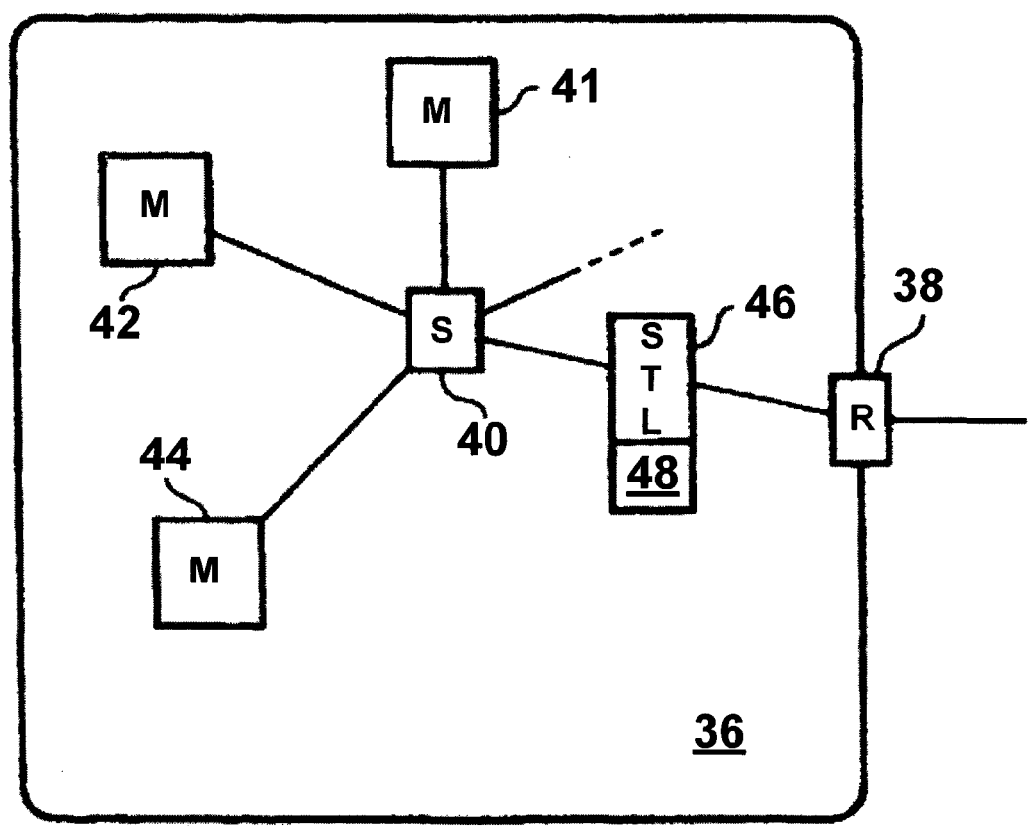
FIG. 3 is a block diagram of an embodiment of a subnet of an IP network that contains a sentinel for monitoring traffic flow.

FIG. 3 shows one embodiment of a subnet 36 in an IP network. Traffic moves in and out of the subnet 36 through router 38. The router 38 is connected to a switch 40 that allows traffic to be communicated between the router 38 and various machines within the subnet 36. In this example, only three other machines 41, 42 and 44 are shown connected to the switch 40, although it will be understood that, in practice, the subnet 38 would most likely contain other devices that are either directly or indirectly connected to switch 40 for communication with the router 38.

A sentinel 46 is connected in the path between the switch 40 and the router 38. The purpose of the sentinel 46 is to assess the behavior of one or more throttled machines within the subnet 36 by scrutinizing connection-based traffic that passes between the switch 40 and the router 38 and hence through the sentinel 46. The sentinel 46 is effectively another machine in the subnet 36, with its own resources 48 for data processing and data storage. The sentinel 46 periodically repeats a pervasion test on each throttled machine that it is configured to monitor, although it will be apparent to the skilled person from the following description of the test that it can easily be modified to run on a continuous basis.

The pervasion test is the same for each machine that is monitored. The pervasion test begins with the sentinel examining any connection requests emanating from the machine that is the subject of the test that pass through the sentinel in an interval of predetermined length T. The sentinel reads the destinations of any such connection requests that are detected and counts the number N of different destinations that are read in the period T (hereinafter N is referred to as the distinct destination count). In the context of an IP network, a "destination" comprises an IP address, possibly in association with the number of a port at the destination machine. The pervasion test ends with a comparison of the number N with a limit L that is specific to the machine under test. If the number N exceeds the limit L, then the sentinel deems the machine under test to be a suspect machine.

Figure 5:
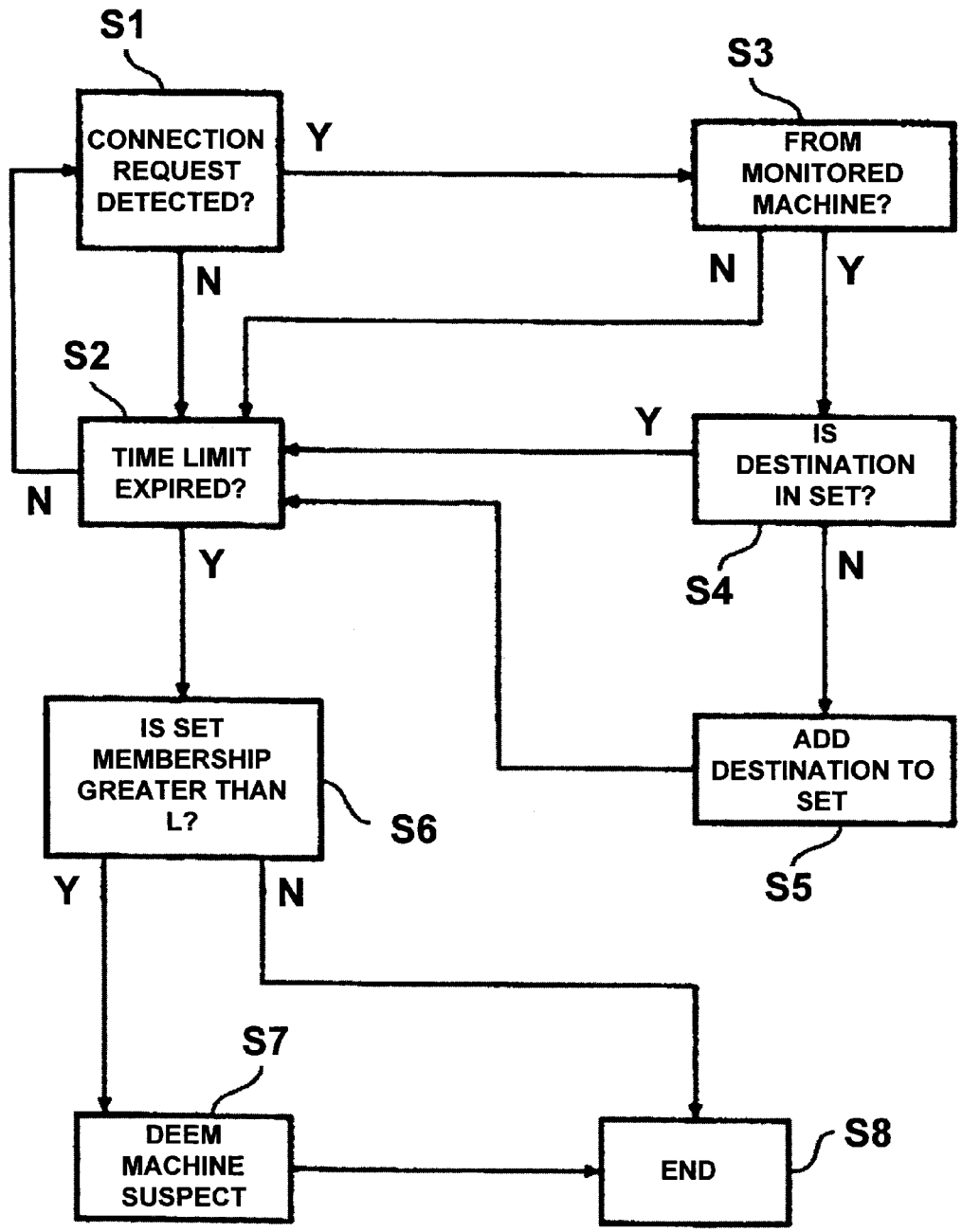
FIG. 5 is a flow chart of a traffic monitoring test according to one embodiment of the present disclosure.

One embodiment of the pervasion test carried out by the sentinel is shown in the flow chart of FIG. 5. The pervasion test begins at step S1, in which the sentinel looks for a connection request in the traffic that is passing through the sentinel. If no connection request is detected, then the sentinel proceeds to step S2, in which the sentinel determines whether or not the time interval T specified for the pervasion test has expired. If the interval has not expired, then the sentinel returns to step S1. If the time interval has expired, then the sentinel proceeds to step S6. If the sentinel detects a connection request in step S1, then the sentinel proceeds to step S3, in which the sentinel determines whether or not the detected connection request emanates from the machine that is the subject of the pervasion test. If the connection request does not originate with the machine in question, then the sentinel returns to step S2. On the other hand, if the connection request does originate with the machine that is the subject of the pervasion test, then the sentinel proceeds to step S4.

In step S4, the sentinel first determines the destination of the connection request and then determines whether or not that destination is present in a set of destinations associated with the machine that is undergoing the pervasion test and which is held in the memory of the sentinel (e.g., at initialization of the pervasion test, the set is placed in an empty state). If the destination is found in step S4 to be present in the set, then the sentinel returns to step S2. On the other hand, if the destination is not present in the set, then the sentinel proceeds to step S5, in which the sentinel adds to the destination to the set. From step S5, the sentinel returns to step S2.

When the sentinel detects in step S2 that the time interval T of the pervasion test has expired, the sentinel proceeds to step S6. In step S6, the sentinel determines whether or not the membership of the set is greater than the limit L. If the membership exceeds L, then the sentinel proceeds to step S7, in which the machine undergoing the pervasion test is deemed to be suspect. If the membership of the set does not exceed L in step S6, then the sentinel proceeds to step S8 in which the pervasion test ends. The sentinel will also move to step S8 from step S7.

The limit L for a particular machine is determined by reference to the characteristics of the throttle that is supposedly applied to that machine. If a throttle dictates that a machine can send traffic freely to a maximum number F of familiar destinations and can send traffic to other destinations at a maximum rate of R distinct destinations per unit time, then the limit to be used when performing the pervasion test on that machine could be set to L=F+RT. However, in practice, the limit L would be set somewhat higher to avoid, for example, falsely concluding that a machine is suspect, when its distinct destination count exceeds F+RT, due to a lack of synchronization between the clock controlling the interval T in the sentinel 46 and the clock controlling the rate R in the machine undergoing the pervasion test.

Consider the case where machines 41, 42 and 44 are supposedly throttled with identical values of F and R, but where machines 42 and 44 have become unthrottled; furthermore, machine 44 has become infected with a virus that causes its host to copy the virus to randomly generated destinations. Performing an iteration of the pervasion test on each of the three machines 41, 42 and 44 will produce three respective distinct destination counts $N_{41}$, $N_{42}$ and $N_{44}$. In practice, it would be expected that $N_{42}$ would be slightly greater than $N_{41}$ (to reflect that machine 42 will sometimes send traffic to more than F+RT destinations in a period T) and that $N_{44}$ would be much greater than either $N_{41}$ or $N_{42}$ (due to the much wider variety of destinations targeted by the virus).

Measurements in a computing network of a typical commercial enterprise have suggested values of $N_{41}$=6, $N_{42}$=6 to 9 and $N_{44}$=50 to 100 where F=5, R=1/sec and T=1 sec. From these results, it is apparent that it is desirable to set the limit L that is to be used with a particular throttled machine to be reasonably close to, but greater than, the value F+RT of that machine, so that throttle failure can be detected even in the absence of virus infection. Returning to the measurements mentioned above, a common limit of L=7 for all three machines would enable sentinel 46 to detect throttle failure in the absence of the virus.

Once the sentinel has deemed a machine to be suspect, one or more threat responses can be initiated against the machine. Some possible threat responses will now be described using, as an example, the situation where machine 42 has been deemed to be a suspect machine.

One potential threat response is simply for the sentinel 46 to alert a human administrator of the subnet 36 to the fact that machine 42 is considered to be suspect. The administrator can then decide what other action may be appropriate.

Another possible threat response is for the sentinel 46 to prevent the machine 42 from sending traffic out on to the subnet 36. Of course, such a response is dependent upon the existence of suitable functionality within the subnet 36, in order to allow the sentinel 46 to exert such control over machine 42. Similar considerations apply to the other threat responses described below.

A further potential threat response is for the sentinel 46 to initiate the installation of a throttle to control the traffic emanating from machine 42. The throttle could be installed at the suspect machine 42, the switch 40, or the router 38, or even within the sentinel 46. Of course, if such a throttle is installed in the sentinel 46 or router 38, then the throttle will not be able to exert control over all of the traffic emanating from machine 42, since the sentinel 46 and the router 38 do not have direct access to all of the paths, which may conduct traffic away from the suspect machine. Moreover, it could be futile to attempt to install a throttle at the suspect machine 42, for example, where the throttle failure has been caused by a virus deactivating the original throttle.

Another potential threat response is for sentinel 46 to cause the suspect machine 42 to divert its traffic through a throttled machine, so that traffic from the suspect machine 42 comes under the control of a throttle. Some ways of achieving this will now be described.

It is conventional for a machine to be provided with certain information about an IP network in which it is to participate. Typically, a machine will be provided with subnet and default router identities. A subnet identity is an expression of the IP addresses of a number of machines that comprise a subnet to which a machine belongs. A default router identity is the IP address of a router that is to be the default choice for a machine when sending network traffic across a boundary of a subnet to which that machine belongs.

Assuming that the machines in subnet 36 utilize subnet and default router identities, the sentinel 46 can initiate the alteration of the subnet and default router identities held by the suspect machine 42, in order to divert traffic from the suspect machine 42 through a throttled machine. Consider the case where traffic from the suspect machine 42 is to be diverted through a surrogate machine 44 operating a throttle. The sentinel 46 initiates the alteration of the subnet identity held by the suspect machine 42, so that the subnet contains, from the perspective of the suspect machine 42, just the suspect machine 42 and the surrogate machine 44. The sentinel also initiates the alteration of the default router identity held by the suspect machine 42, so that the surrogate machine 44 becomes the default router of the suspect machine.

Once these alterations have taken effect, traffic from the suspect machine 42 will only be able to reach the wider network by passing through the surrogate machine 44. Hence, traffic from the suspect machine 42 will pass under the control of the throttle that is installed on the surrogate machine 44.

A DHCP (dynamic host configuration protocol) server provides leases to subservient machines in an IP network. These leases provide the subservient machines with their IP addresses and subnet and default router identities. The leases have a predetermined duration of validity and a subservient machine will be required to apply to its DHCP server for a new lease in anticipation of the expiry of its current lease.

Figure 6:
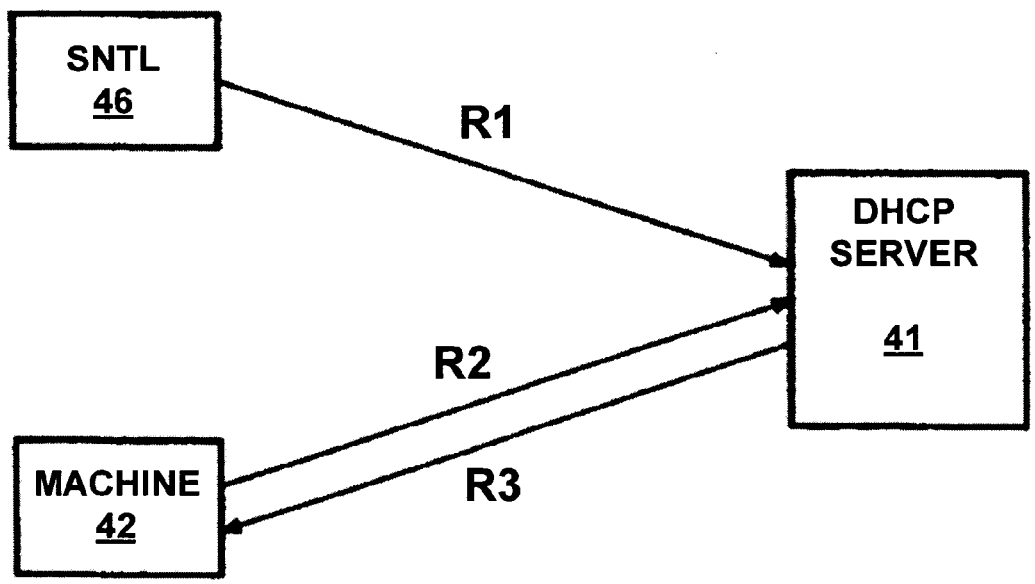
FIG. 6 is a block diagram illustrating the interaction of machines in a network with a DHCP (domain host configuration protocol) server in one embodiment of the present disclosure.

Consider the case where machine 41 is a DHCP server that is arranged to manage the subnet and default router identities of the suspect and surrogate machines 42 and 44. The sentinel 46 can be configured to cause the DHCP server 41 to use, henceforth in leases for the suspect machine 42, a subnet identity defining a subnet of just the suspect and surrogate machines 42 and 44 and a default router identity specifying the surrogate machine 44. Thus, when the suspect machine 42 next requests a lease from the DHCP server 41, the subnet and default router identities of the suspect machine 42 will be updated to give effect to the traffic diversion. The process by which this traffic diversion is implemented is outlined in FIG. 6. The sentinel 46 sends an instruction R1 to the DHCP server 41 requiring the DHCP server to make the desired modifications to the leases that the DHCP server dispenses to machine 42. At some later time, suspect machine 42 sends a request R2 to the DHCP server 41 for a new DHCP lease. The DHCP server 41 responds to the request R2 with a new DHCP lease R3 containing the desired modifications to the subnet and default router identities to be used by suspect machine 42.

It will be appreciated that the time that elapses between the initiation of a traffic diversion of the suspect machine 42 by the sentinel 46 and the implementation of the diversion by the DHCP server 41 will depend, to a certain extent, on the time which has to elapse before the suspect machine needs to apply for a new lease. Obviously, if the DHCP server 41 issues leases with a short duration, then the DHCP server 41 can get a desired traffic diversion in place more quickly.

Figure 7:
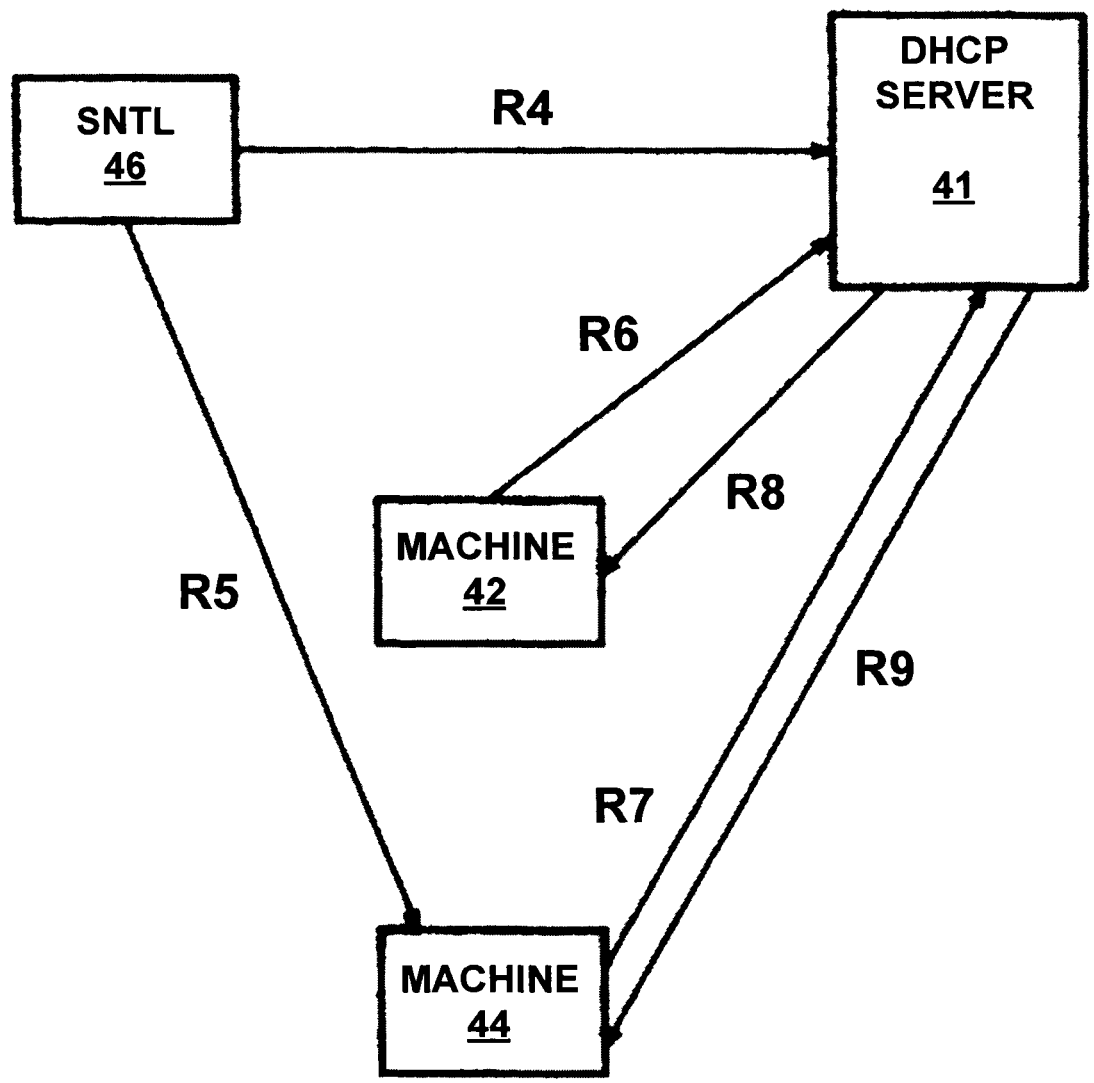
FIG. 7 is a block diagram illustrating the interaction of machines in a network with a DHCP (domain host configuration protocol) server in another embodiment of the present disclosure.

Rather than waiting for the implementation of a traffic diversion to be triggered by lease expiry, it is possible to arrange for the sentinel 46 to provoke the suspect machine 42 into obtaining a new lease. This can be achieved by arranging for the sentinel 46 to cause the IP address of a machine that neighbors the suspect machine 42 in the subnet 36 to be made identical to the IP address of the suspect machine. The IP address conflict caused by this change forces the two machines to obtain fresh DHCP leases, at which stage the suspect machine should obtain a lease implementing the desired traffic diversion. Consider the case, as illustrated in FIG. 7, where machine 41 is again a DHCP server and the sentinel 46 provokes a subnet address conflict between machines 44 and 42, the latter machine being the suspect machine.

The sentinel 46 sends an instruction R4 to DHCP server 41 instructing the server to make the desired modifications to the leases that are to be dispensed to machine 42. The sentinel 46 then sends an instruction R5 to machine 44 requiring machine 44 to alter its IP address, 1 so that it is the same as that of machine 42. At some later moment in time, machines 42 and 44 detect the fact that their IP address are in conflict and send respective requests R6 and R7 to DHCP server 41 for fresh DHCP leases to resolve the conflict. The DHCP server 41 responds to requests R6 and R7 by returning new leases R8 and R9 to machines 42 and 44, respectively, at which time machine 42 acquires the subnet and default router identity modifications that are necessary to put the desired traffic diversion in place.

Another way of creating a traffic diversion to a throttled machine, involving a SOCKS server, will now be described. It is known to deploy a SOCKS server in a network to act as a proxy for a machine when the latter attempts to exchange traffic with a machine lying outside the network. A machine in a network may need a proxy of this kind if the machine is barred under a security policy applied to the network from exchanging traffic with machines outside the network. In order to use a SOCKS server, a machine is provided with a SOCKS shim. A SOCKS shim is a piece of software that identifies attempts by a machine in a network to exchange traffic with machines outside the network and channels such attempts to a predetermined SOCKS server, which will perform the attempts on behalf of the requesting machine.

Figure 8:
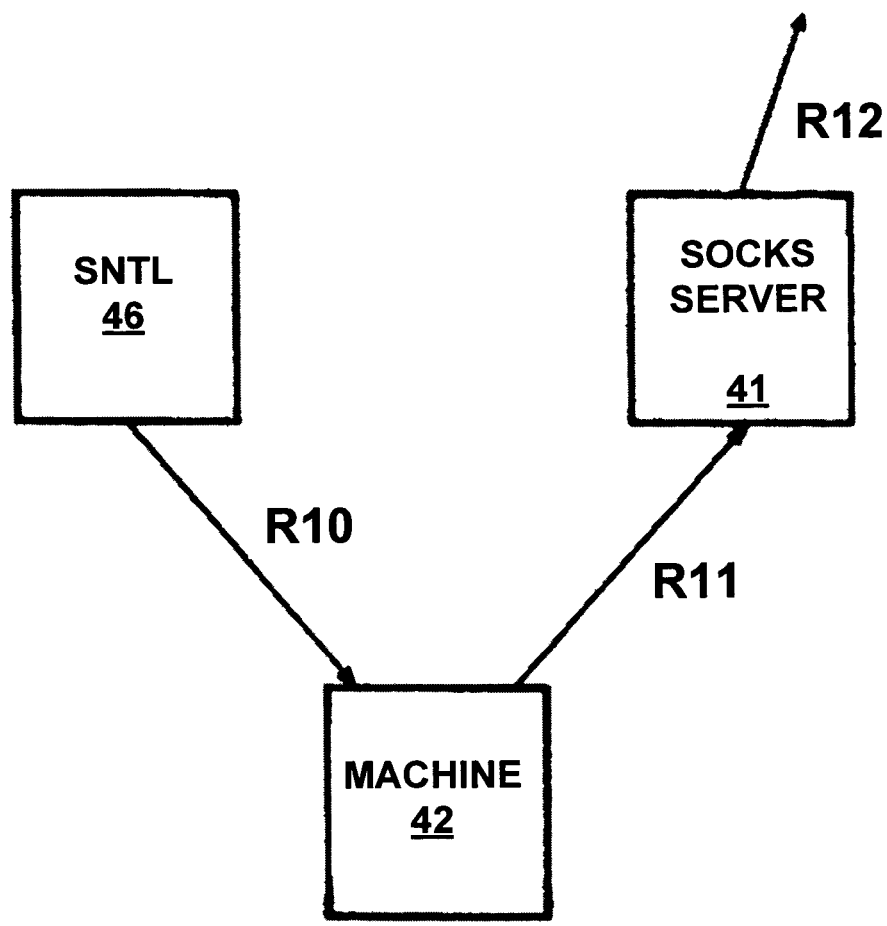
FIG. 8 is a block diagram of some machines in a network interacting with a SOCKS server in an embodiment of the present disclosure.

Instead of implementing a traffic diversion by altering subnet and default router identities, the sentinel 46 could be arranged to install on the suspect machine 42, a SOCKS shim that is configured to identify attempts by the suspect machine 42 to communicate with machines outside the network and redirect such attempts to a throttled SOCKS server. Thus, traffic from the suspect machine 42 would become subject to the controlling action of the throttle that is present on the SOCKS server. This process is illustrated in FIG. 8, which assumes that machine 41 is a SOCKS server.

The sentinel 46 sends a communication R10 to the suspect machine 42, forcing that machine to install a SOCKS shim. Thereafter, when machine 42 makes an attempt R11 to communicate with a machine outside the subnet, the communication attempt R11 is routed to the SOCKS server 41 by the SOCKS shim. Thus, the communication R11 is subjected to the throttling process that is active within server 41, before being relayed to its destination as communication R12.

It will be apparent that threat responses other than those described above may be used. It may also be desirable for the sentinel to initiate more than one kind of threat response upon detection of a suspect machine. Clearly, many variations are possible to the scheme outlined with reference to FIG. 3. Some of these will now be discussed.

The process that the sentinel 46 uses to decide whether a machine is suspect can, of course, be varied. In one embodiment, the sentinel 46 does not use the pervasion test and, instead, performs a continuous analysis of the traffic emanating from a machine that is to be evaluated. In this embodiment, the sentinel 46 continuously scans for connection requests from the machine under assessment in the traffic flowing through the sentinel. The sentinel 46 determines if the destinations of any such connection requests that are detected are specified in a "working set" that is maintained by the sentinel for the machine being assessed. If the sentinel 46 fails to find a destination in the working set, then the sentinel will determine if the destination is specified in an "unfamiliar set" that is maintained by the sentinel for the machine under assessment. If the sentinel 46 fails to find a destination in the unfamiliar set, then it will add the destination to that set. The sentinel 46 is arranged to transfer destinations from the unfamiliar set to the working set at a predetermined rate. The working and unfamiliar sets are both organized as FIFO (first in, first out) buffers, of restricted and unrestricted length, respectively. If the sentinel 46 detects that the membership of the unfamiliar set exceeds a predetermined size, then the machine under assessment is deemed to be a suspect machine and the sentinel initiates one or more threat responses against that machine. Specific information about the traffic behavior of the machine under assessment (e.g. limit L) is not required and so unthrottled, as well as throttled, machines can now be scrutinized. The processing steps carried out by the sentinel 46 in this variant are illustrated in the flow chart of FIG. 9.

In step S9, the sentinel 46 examines the passing traffic for connection requests. If no connection request is detected, the sentinel proceeds to step S10. In step S10, the sentinel assesses whether or not it is time to transfer one or more destinations from the unfamiliar set to the working set. If insufficient time has passed, the sentinel returns to step S9. Otherwise, the sentinel proceeds to step S11 in which one or more destinations are transferred from the unfamiliar set to the working set (this transfer being, of course, contingent upon the presence of sufficient destinations in the unfamiliar set). From step 11, the sentinel returns to step S9.

Upon the detection of a connection request in step S9, the sentinel proceeds to step S12, in which the sentinel determines whether or not the detected connection request emanates from the machine that is being scrutinized. If the connection request originates from the machine under test, then the sentinel proceeds to step S13; otherwise, the sentinel returns to step S10. In step S13, the sentinel determines whether the destination of the connection request is present in the working set. If the destination is in the working set, then the sentinel returns to step S10; otherwise, the sentinel proceeds to step S14. In step S14, the sentinel determines whether the destination is in the unfamiliar set. If the destination is present in the unfamiliar set, the sentinel returns to step S10; otherwise, the sentinel proceeds to step S15, in which the destination is added to the unfamiliar set. From step S15, the sentinel proceeds to step S16, in which the size of the unfamiliar set is scrutinized. If the sentinel determines in step S16 that the predetermined maximum size for this set has been exceeded, then the sentinel proceeds to step S17; otherwise, the sentinel returns to step S10. In step S17, the sentinel deems the machine under test to be suspect, and the monitoring process ends.

Figure 9:
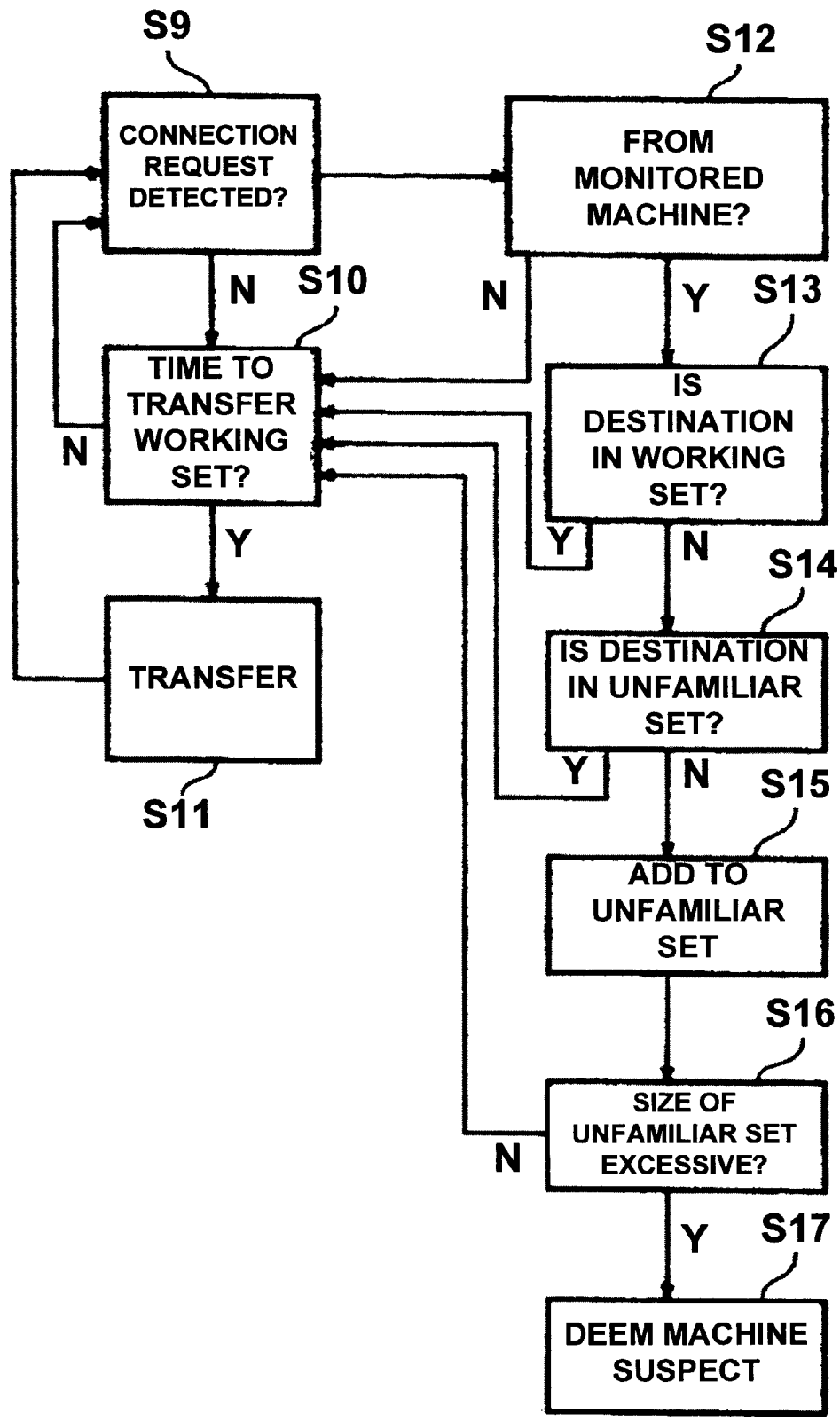
FIG. 9 is a flow chart of a traffic monitoring test used in an embodiment of the present disclosure.

When the sentinel 46 operates as described in FIG. 9, a further kind of threat response is available. Upon determining that a machine is suspect, the sentinel can continue to maintain the unfamiliar and working sets (e.g., by looping from step S17 to step S10) and preventing connection requests from travelling to the destinations in the unfamiliar set for as long as those destinations are specified in that set.

In the arrangement shown in FIG. 3, the sentinel 46 is located in the path between the switch 40 and the router 38. It is, however, possible to site the sentinel elsewhere. For example, in FIG. 3, rather than being provided in a dedicated unit, the sentinel could be incorporated in the router 38 or the switch 40. Since the sentinel does not impede the passage of network traffic, it will not hamper the operation of either the router or the switch. Another possible location for the sentinel is shown in FIG. 4.

Figure 4:
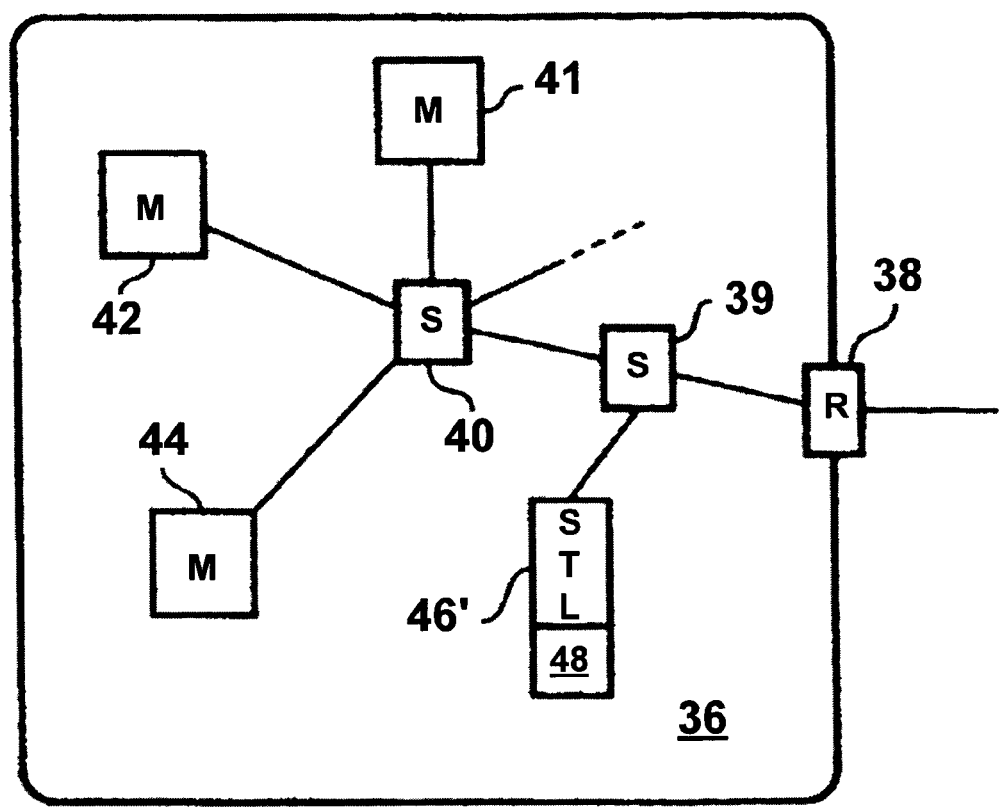
FIG. 4 is a block diagram of an alternative disposition of the sentinel shown in FIG. 3.

FIG. 4 is largely the same as FIG. 3, and elements carried over to FIG. 4 from FIG. 3 retain the same reference numerals. In FIG. 4, the sentinel 46' is located in a branch leading from the path between switch 40 and router 38. An additional switch 39 is provided in that path and that switch is arranged to copy all of the traffic that it receives from switch 40 or router 38 and to direct the copied traffic to the sentinel 46'. In this configuration, the sentinel 46' is capable of performing the same examination of the traffic passing between the router 38 and the switch 40 as before in FIG. 3, although it is no longer suitable as a site for implementing a throttle on traffic from a suspect machine, because the sentinel 46' no longer lies in the direct path between the router 38 and the switch 40.

It may be the case that a machine being monitored by a sentinel has a tendency to send out, legitimately, traffic to a relatively wide variety of destinations from a certain port. So that such activity does not bias the operation of a sentinel, the sentinel can, in one embodiment, be arranged to ignore traffic from ports of this type within a machine being monitored. There may be other reasons why it would be desirable for a sentinel to examine traffic coming from only a subset of the ports of a machine. In the extreme, the subset could consist of just a single port. Also, it is possible to arrange that multiple versions of a sentinel examine traffic coming from a particular machine. Each version could then be limited to examining traffic stemming from a different subset of the ports of the machine.

In the embodiments described above, the sentinel monitors destinations of connection-based traffic by scanning for connection requests. Of course, it is possible to arrange that the sentinel alternatively or additionally monitors destinations of connectionless traffic. It will be apparent that many other variants to the schemes described in this document can be conceived.

It should be emphasized that the above-described embodiments are merely possible examples of implementations, merely set forth for a clear understanding of the principles of the present disclosure. Many variations and modifications may be made to the above-described embodiments without departing substantially from the spirit and principles of the present disclosure. All such modifications and variations are intended to be included herein within the scope of this disclosure.

Therefore, having thus described the invention, at least the following is claimed:

1. Apparatus for monitoring from a first location in a computer network traffic emanating from a source at a second location in the network, the apparatus comprising:
    means embodied in a machine at the first location for detecting traffic emanating from the source and
    means embodied in the machine for monitoring the number, per unit time, of distinct destinations of the traffic that lie outside a first set specifying familiar destinations of the traffic.

2. Apparatus according to claim 1, wherein the monitoring means comprises means for discerning if an actual number, per unit time, of destinations of the traffic exceeds a permissible number, per unit time, of destinations of the traffic.

3. Apparatus according to claim 1, wherein the monitoring means comprises storage means for holding the first set and means for discerning if destinations of the traffic lie outside the first set.

4. Apparatus according to claim 3, wherein the storage means is adapted to store a second set into which the discerning means is adapted to place destinations of the traffic that are not to be found in the first set.

5. Apparatus according to claim 4, wherein the monitoring means comprises means for removing destinations from the second set.

6. Apparatus according to claim 5, wherein the removing means is adapted to remove destinations from the second set at a predetermined rate.

7. Apparatus according to claim 5, wherein the removing means is adapted to add to the first set destinations that are being removed from the second set.

8. Apparatus according to claim 5, wherein the monitoring means comprises comprising means for examining the size of the second set.

9. Apparatus according to claim 8, wherein the examining means is adapted to compare the size of the second set with a threshold.

10. Apparatus according to claim 1, wherein the first set is dynamic.

11. Apparatus according to claim 1, further comprising means for removing destinations from the first set.

12. Apparatus according to claim 11, wherein the removing means is adapted to remove a destination from the first set if that destination has not matched a destination of the traffic for a certain amount of time.

13. Apparatus according to claim 1, further comprising means for notifying a human administrator of the network upon detection of the number satisfying a predetermined condition.

14. Apparatus according to claim 1, further comprising means for imposing throttling means on the source, wherein the throttling means is adapted to hold a list of destinations of the traffic and to delay the traffic if bound for a destination outside the list.

15. Apparatus according to claim 14, wherein the throttle imposing means is adapted to divert at least part of the traffic to the throttling means.

16. Apparatus according to claim 14, wherein the throttle imposing means is adapted to install the throttling means at the second location.

17. Apparatus according to claim 14, wherein the throttle imposing means is adapted to install the throttling means at a location in the network other than the second location.

18. Apparatus according to claim 17, wherein the throttle imposing means is adapted to install the throttling means at a network switch or a network router.

19. Apparatus according to claim 1, wherein at least some of the traffic obeys a connection-based protocol and the traffic detecting means is adapted to acquire destinations of the traffic from connection requests contained in the connection-based traffic.

20. A method of monitoring from a first location in a computer network traffic emanating from a source machine at a second location in the network, the method comprising:
    a step of detecting by a network machine at the first location traffic emanating from the source machine and
    a step of monitoring by the network machine the number, per unit time, of distinct destinations of the traffic that lie outside a first set specifying familiar destinations of the traffic.

21. A method according to claim 20, wherein the monitoring step comprises the step of discerning if an actual number, per unit time, of destinations of the traffic exceeds a permissible number, per unit time, of destinations of the traffic.

22. A method according to claim 20, wherein the monitoring step comprises the step of discerning if destinations of the traffic lie outside the first set.

23. A method according to claim 22, wherein the discerning step comprises placing destinations of the traffic that are not to be found in the first set into a second set.

24. A method according to claim 23, further comprising the step of removing destinations from the second set.

25. A method according to claim 24, wherein the removing step comprises removing destinations from the second set at a predetermined rate.

26. A method according to claim 24 wherein the removing step comprises adding to the first set destinations that are being removed from the second set.

27. A method according to claim 24, wherein the monitoring step further comprises the step of examining the size of the second set.

28. A method according to claim 27, wherein the examining step comprises comparing the size of the second set with a threshold.

29. A method according to claim 20, wherein the first set is dynamic.

30. A method according to claim 20, further comprising the step of removing destinations from the first set.

31. A method according to claim 30, wherein the removing step comprises removing a destination from the first set if that destination has not matched a destination of the traffic for a certain amount of time.

32. A method according to claim 20, further comprising the step of notifying a human administrator of the network upon detection of the number satisfying a predetermined condition.

33. A method according to claim 20, further comprising the step of imposing a throttle on the source machine upon detection of the number satisfying a predetermined condition, wherein the throttle is adapted to hold a list of destinations of the traffic and to delay the traffic if bound for a destination outside the list.

34. A method according to claim 33, wherein the throttle imposing step comprises diverting at least part of the traffic to the throttle.

35. A method according to claim 33, wherein the throttle imposing step comprises installing the throttle at the second location.

36. A method according to claim 33, wherein the throttle imposing step comprises installing the throttle at a location in the network other than the second location.

37. A method according to claim 36, wherein the throttle imposing step comprises installing the throttle at a network switch or a network router.

38. A method according to claim 20, wherein at least some of the traffic obeys a connection-based protocol and the traffic detecting step comprises the step of acquiring destinations of the traffic from connection requests contained in the connection-based traffic.

39. A program embodied in a computer readable medium for causing data processing apparatus to carry out a method of the kind specified in claim 20.

* * * * *